No. 771,213. PATENTED SEPT. 27, 1904.
A. U. SMITH.
SCALE.
APPLICATION FILED JUNE 10, 1903.
NO MODEL.
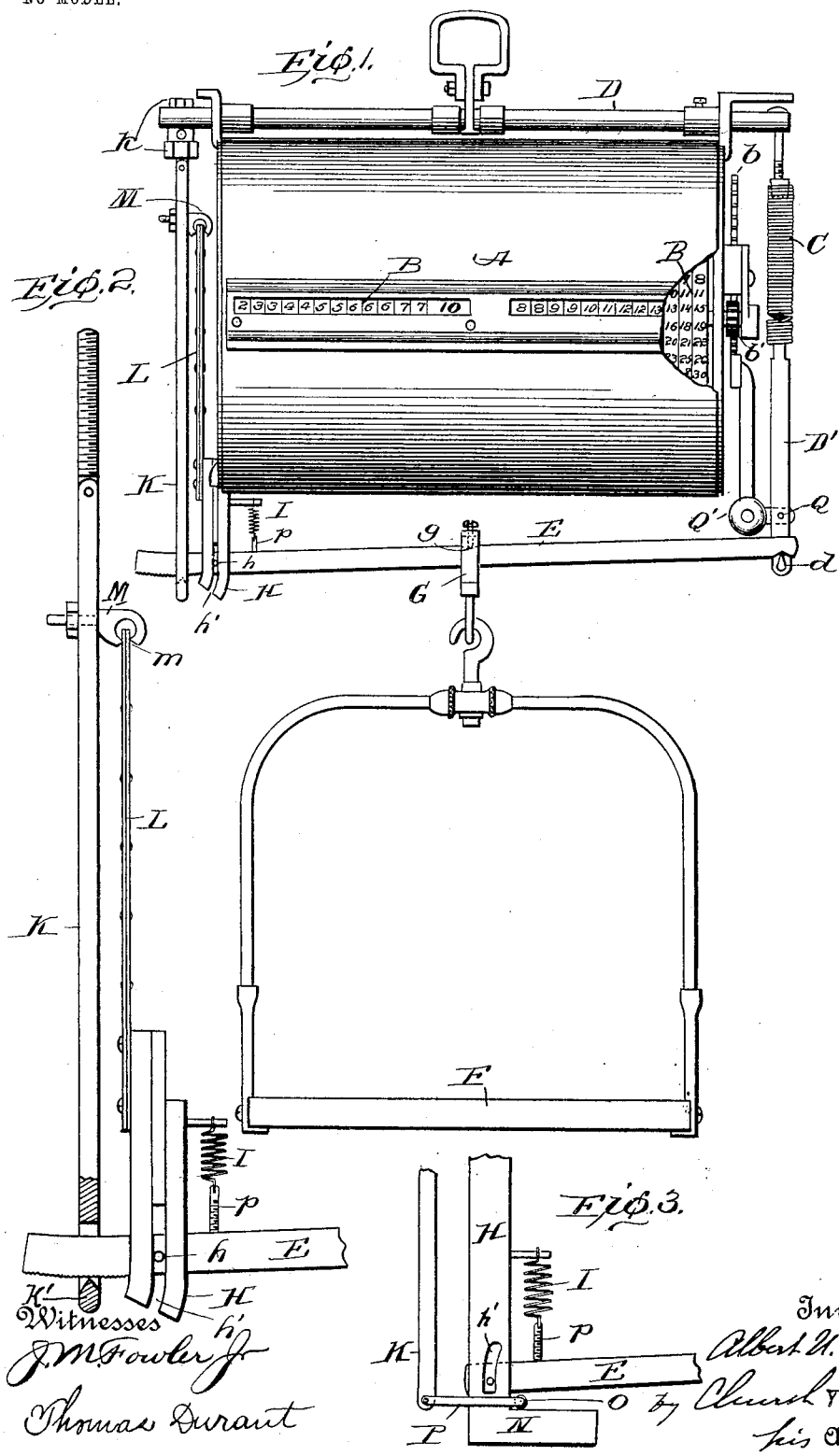

No. 771,213.

Patented September 27, 1904.

UNITED STATES PATENT OFFICE.

ALBERT U. SMITH, OF SAUGATUCK, CONNECTICUT.

SCALE.

SPECIFICATION forming part of Letters Patent No. 771,213, dated September 27, 1904.

Application filed June 10, 1903. Serial No. 160,933. (No model.)

*To all whom it may concern:*

Be it known that I, ALBERT U. SMITH, of Saugatuck, in the county of Fairfield, State of Connecticut, have invented certain new and useful Improvements in Scales; and I do hereby declare the following to be a full, clear, and exact description of the same, reference being had to the accompanying drawings, forming a part of this specification, and to the letters of reference marked thereon.

This invention relates to improvements in scales, the invention being especially applicable to spring-balance scales or scales wherein the weight of the goods is counterbalanced by a spring or springs, the objects of the invention being to provide a means whereby variations due to changes in temperature may be neutralized or compensated for and the scale made to give correct indications of the true weight of articles at any temperature.

The invention consists, primarily, in introducing a lever between the load and counterbalancing spring or springs, with means, such as a thermostat, for varying the effective leverage of the lever in proportion to the variations in the counterbalancing spring or springs and in direction to neutralize or counteract the effect of such variations.

The invention further consists in certain novel details of construction and combinations and arrangements of parts, all as will be now described, and pointed out particularly in the appended claims.

In the accompanying drawings, Figure 1 is a front elevation of a scale embodying the present improvements, portions of the casing being omitted to show mechanism which would be concealed thereby. Fig. 2 is a detail of the thermostat and parts directly associated therewith, on an enlarged scale. Fig. 3 is a similar view showing a modification.

Like letters of reference in the several figures indicate the same parts.

The particular type of scale adopted for illustrating the invention is one wherein a cylindrical casing A contains an indicator B, journaled in bearings at each end of the casing and adapted to be rotated by a rack and pinion $b$ $b'$, which in the scale illustrated are at one end of the casing and cylinder. The counterbalancing-spring C, suspended from the cross-rod D, as usual, is pivotally connected through an extension D' and suitable bearings, preferably knife-edges $d$, with a lever E below the casing. The goods-receiver F is connected with the lever through a draft block or support G, preferably pivotally connected with the lever approximately midway of its length, the pivotal connection being preferably a point-bearing $g$, whereby the goods-receiver is free to swing in any direction, this being especially desirable where the invention is applied to the suspended or swinging type of scales, such as illustrated, although it will be understood that any approved or preferred type of pivotal connection may be employed here and at any other point where pivotal connections are employed. At its opposite end the lever E is guided by a downward extension H of the casing, usually by passing through a slot in the extension with a transverse pin $h$ in the lever and working in a curved slot $h'$ in the extension, while a light spring I normally supports this end of the lever when no weight is on the receiver. The fulcrum of the lever is movable toward and from the point of attachment of the load to vary the effective leverage of the lever and neutralize or compensate for the variations in the counterbalancing-spring due to changes in temperature. Its movements are preferably controlled by a thermostat, so as to be automatic. As a convenient mechanism for accomplishing this the fulcrum may be formed on or moved by a lever K, pivotally supported from the casing, or, as shown, supported by the opposite end of the bar to which the counterbalancing-spring is connected, the connection with the support preferably being adjustable, as by lock-nuts $k$. As shown in Figs. 1 and 2, the lower end of the lever K has a knife-edge pivot K' thereon to form the fulcrum of the lever E, and the latter is finely serrated to coöperate with the knife-edge, the serrated surface being preferably formed on the arc of a circle with the pivot of the lever K as a center. The thermostat shown is of the usual construction, embodying metal strips L, having different coefficients of expansion and is attached at one end to the casing and at the opposite end coöperates with the lever K near its pivot. The connection with the lever may conveniently be adjustable by a clip M, threaded into or otherwise adjustably connected with the lever and having edge bearings $m$, between which the thermostat projects. As thus constructed when no load is on the receiver the end of the lever E is held by the light spring just out of contact with the fulcrum, and the latter is free to be moved by the thermostat and will always be held thereby in proper position to give the correct leverage for the temperature then prevailing; but as soon as a load is placed on the receiver the lever will be brought into engagement with its fulcrum and subsequently turns about the fulcrum as the counterbalancing-spring is elongated by the load.

The particular form of thermostat is quite immaterial, and it is obvious that the shifting or movable pivot may be modified and changed without departing from the invention. For instance, in Fig. 3 the pivot is supported directly by a bearing N on the frame or casing and is in the form of a small roller O, connected with the lower end of the lever by a link P, so as to be shifted thereby. A knife-edge may be substituted for the roller, the advantage of the arrangement being that the fulcrum has a fixed support and it is located approximately directly under the spring I. The spring I is preferably adjustably connected with the lever or casing, as by a screw-eye $p$, whereby the lever may be adjusted to normally just clear the fulcrum; but it will be understood that the action of the spring I does not influence the weighing of the scale to an appreciable extent, for the scale will indicate correctly even though the goods be of insufficient weight to bring the lever into contact with the fulcrum. The rack-bar is preferably connected with the spring extension by a pivotal connection Q, whereby it may accommodate itself to the transverse movements of the end of the lever, and it is held in engagement with the pinion by a weight Q', as is usual in this type of scale.

The invention is applicable to any type of scale wherein the counterbalancing mechanism is affected by changes in temperature, and it is a simple matter of calculation to determine the necessary changes in the ratio of leverage to insure the accurate operation of the scale at all temperatures to which weighing apparatus is liable to be subjected in use.

Having thus described my invention, what I claim as new, and desire to secure by Letters Patent, is—

1. In a scale, the combination with the goods-support and counterbalancing mechanism, of a lever interposed between the goods-support and counterbalancing mechanism, a shiftable pivot for varying the effective leverage of said lever and means for automatically shifting said pivot to neutralize the effect of changes in temperature on the counterbalancing mechanism; substantially as described.

2. In a scale the combination with the goods-support and counterbalancing mechanism, of a lever interposed between the goods-support and counterbalancing mechanism, a shiftable pivot for varying the effective leverage of said lever and a thermostat for shifting said pivot to neutralize the effect of changes in temperature on the counterbalancing mechanism; substantially as described.

3. In a scale, the combination with the goods-support and counterbalancing-spring, of a lever interposed between the goods-support and spring and a thermostat for varying the distance between the fulcrum and point of attachment of the goods-support to vary the effective leverage and compensate for the effect of variations in temperature on the counterbalancing-spring; substantially as described.

4. In a scale the combination with the goods-support and counterbalancing-spring, of a lever interposed between the goods-support and spring, a shiftable fulcrum for said lever and means for shifting said fulcrum to compensate for the effect of variations in temperature on the counterbalancing-spring; substantially as described.

5. In a scale, the combination with the goods-support and counterbalancing-spring, of a lever interposed between the goods-support and spring, a shiftable fulcrum for the lever and a thermostat for shifting said fulcrum to automatically compensate for the effect of variations in temperature on the counterbalancing-spring; substantially as described.

6. In a scale, the combination with the goods-support and counterbalancing-spring, of a lever interposed between the goods-support and spring, a shiftable fulcrum for the lever, means for holding the lever and fulcrum out of contact when no load is present and permitting them to engage when a load is present and a thermostat for shifting the fulcrum to compensate for the effect of variations in temperature on the spring; substantially as described.

7. In a scale the combination with the goods-support and counterbalancing-spring, of a lever interposed between the goods-support and spring, a shiftable fulcrum for the lever, a spring for holding the lever and fulcrum out of contact when no load is present and a thermostat for shifting the fulcrum to compensate for the effect of variations in temperature on the spring; substantially as described.

8. In a scale, the combination with the goods-support and counterbalancing-spring, of a lever interposed between the goods-support and spring, a fixed guide for the lever, a shiftable fulcrum for the lever, a thermostat for shifting the fulcrum and a spring for holding the lever and fulcrum normally out of engagement to permit said fulcrum to shift without resistance; substantially as described.

9. In a scale, the combination with the frame, indicator, goods-support and counterbalancing-spring, of a lever connected at one end with the spring and at an intermediate point with the goods-support, a shiftable fulcrum supported by the frame and a thermostat on the frame for shifting said fulcrum; substantially as described.

10. In a scale, the combination with the frame, indicator, goods-support and counterbalancing-spring, of a lever connected at one end with the spring and at an intermediate point with the goods-support, a shiftable fulcrum pivotally connected with the frame, a thermostat on the frame for shifting said fulcrum, a guide for holding the lever against bodily movement with relation to the fulcrum and a spring for normally holding the lever and fulcrum out of engagement; substantially as described.

11. In a scale the combination with the frame, goods-support, counterbalancing-spring, and lever interposed between the goods-support and spring, of a fulcrum for the lever carried by a support pivotally connected with the frame, a bearing on the lever with which the fulcrum coöperates formed on the arc of a circle with the axis of the fulcrum-support as a center and a thermostat for shifting the said fulcrum; substantially as described.

12. In a scale embodying a goods-receiver, a counterbalancing mechanism and a lever interposed between the goods-receiver and counterbalancing mechanism, means for automatically shifting the relative position of the bearings of said lever to vary its effective leverage proportional to the variation of the counterbalancing mechanism due to changes in temperature; substantially as described.

13. In a combined spring and lever scale, a weighing-lever having a longitudinally-movable pivot and thermostatic devices adapted to impart movement to said pivot.

ALBERT U. SMITH.

Witnesses:
 PATRICK BOLAND,
 RUFUS WAKEMAN.